(12) United States Patent
Rhetat et al.

(10) Patent No.: US 8,096,440 B2
(45) Date of Patent: Jan. 17, 2012

(54) PRESSURE COOKER EQUIPPED WITH A GRIPPING PART ATTACHED TO THE PAN

(75) Inventors: Eric Jacques Rhetat, Dijon (FR); Michel Pierre Cartigny, Mirebeau sur Beze (FR)

(73) Assignee: SEB S.A., Ecully (FR)

( * ) Notice: Subject to any disclaimer, the term of this patent is extended or adjusted under 35 U.S.C. 154(b) by 503 days.

(21) Appl. No.: 12/174,946

(22) Filed: Jul. 17, 2008

(65) Prior Publication Data

US 2009/0020538 A1  Jan. 22, 2009

(30) Foreign Application Priority Data

Jul. 20, 2007 (FR) ...................... 07 05261

(51) Int. Cl.
- *B65D 45/00* (2006.01)
- *B65D 53/00* (2006.01)
- *A47J 27/00* (2006.01)
- *A47J 36/00* (2006.01)
- *A47J 45/07* (2006.01)
- *A47J 27/08* (2006.01)

(52) U.S. Cl. ..................... 220/573.1; 220/327; 220/752; 220/756; 220/768; 220/912; 16/422; 16/425; 99/337

(58) Field of Classification Search ............... 220/327, 220/573.1, 752, 756, 768, 912; 16/422, 425; 99/337

See application file for complete search history.

(56) References Cited

U.S. PATENT DOCUMENTS

| | | | | |
|---|---|---|---|---|
| 4,397,398 | A | * | 8/1983 | Watanabe .......................... 220/7 |
| 5,902,623 | A | * | 5/1999 | Cochran ........................ 426/466 |
| 6,125,842 | A | * | 10/2000 | Loyd et al. .................. 126/386.1 |
| 7,086,326 | B2 | * | 8/2006 | Yokoyama ....................... 99/413 |
| D612,193 | S | * | 3/2010 | Darling ........................... D7/354 |
| 2005/0132895 | A1 | * | 6/2005 | Seurat Guiochet et al. .... 99/337 |
| 2008/0245805 | A1 | * | 10/2008 | Ferron ........................... 220/752 |

* cited by examiner

*Primary Examiner* — Anthony Stashick
*Assistant Examiner* — Madison L Wright
(74) *Attorney, Agent, or Firm* — Thomas, Kayden, Horstemeyer & Risley, LLP

(57) ABSTRACT

Pressure cooker equipped with a gripping part attached to the pan.

The invention relates to a domestic pressure cooker comprising:
- a pan (2) which itself comprises a wall.
- a lid designed to be attached to the pan (2) to form with the latter a cooking chamber that is substantially impervious.
- at least one gripping part (20), attached to the pan (2) by means of attachment means (20A),
- characterized in that the attachment means (20A) at least comprise:
- an attachment orifice (200A) passing through the wall of the pan (2), wherein said attachment orifice (200A) is positioned on the wall of the pan (2) so that it does not communicate with the inside of the cooking chamber,
- and an attachment part (201A), connected to the gripping part (20) and extending through the attachment orifice (200A).

Cooking devices.

10 Claims, 5 Drawing Sheets

A-A

PRESSURE COOKER EQUIPPED WITH A GRIPPING PART ATTACHED TO THE PAN

CROSS REFERENCE RELATED APPLICATIONS:

This application claims priority to copending French Patent Application No. 07 05261 filed Jul. 20, 2007, which is entirely incorporated herein by reference.

This invention relates more particularly to a domestic pressure cooker comprising:
 a pan which itself comprises a wall.
 a lid designed to be attached to the pan to form with the latter a cooking chamber that is substantially impervious.
 and at least one gripping part, attached to the pan by means of attachment means.

Domestic pressure cookers are well-known. They are usually composed of a metallic pan designed to accommodate food and a lid, also metallic, designed to be added and locked onto the pan to form with the latter an impervious cooking chamber.

Such a pressure cooker is designed to be subjected to the influence of a source of heat (such as for example a cooking hob) so as to permit the increase in pressure and temperature of the chamber and thus the pressurised cooking of the food contained therein.

The pan of these known pressure cookers is usually equipped with a pair of handles, fixed to the lateral wall of the pan diametrically opposite one another, wherein said handles extend from the lateral wall of the pan towards the outside of the latter. These handles permit the user to handle not only the pan but also and most especially the complete pressure cooker (formed by the assembly of the pan and the lid), in particular when said pressure cooker is filled with food that is cooked or to be cooked, possibly accompanied with a cooking liquid.

The metallic pan is generally obtained by metallurgical manufacturing methods such as stamping. The handles are usually made from a heat-hardening material that is thermally insulating, in order to avoid the user getting burned when holding the handles when the pan is hot.

The difference in nature between the pan (obtained by stamping a metallic blank) and the handle (obtained by moulding a heat hardening material) of course prohibits a pan equipped with its handles to be made in one piece. It is therefore necessary to add the handles onto the pan and to attach them to the latter.

For this purpose, it is known to fix to the external face of the lateral wall of the pan a metallic bridge, for example by welding. The handle is then assembled onto the bridge by means of a metallic screw, wherein the latter passes through the handle and is screwed into the bridge centripetally with respect to the general axis of symmetry of the pan (from the outside towards the inside), Such a pressure cooker, while it generally provides satisfaction, nevertheless has a certain number of disadvantages.

Consequently, the use of a metallic bridge to attach each handle onto the pan contributes to increasing the complexity and cost of the manufacturing operations of the pressure cooker, given that it requires extra raw material to make the bridge (wherein said raw material is additionally, as it is made of steel, increasingly rare and costly) and precise welding operations requiring not only specific equipment but also qualified labour.

Furthermore, the head of the screw assembling the handle to the bridge must be, taking account of the assembly made (centripetal screwing), necessarily accessible from the outside of the pressure cooker. Whereas, the screw is itself in direct contact with the bridge into which it is screwed, wherein said bridge is itself in direct contact with the wall of the pan to which it is welded, wherein said pan is itself subjected to the influence of the source of heat. Consequently, due to thermal conduction, the screw head may be very hot and thus form a source of serious accidents by burning of the used who inadvertently touches its when wanting to hold the handles.

This is why the handle must be conformed to avoid the user inadvertently touching the screw head when holding the handles. Such conformation, which is imposed by the safety regulations in many countries, involves extra material which increases the cost of the pressure cooker, whereas the latter is a utensil of large consumption that should be accessible to as many people as possible. These requirements of the standards further constitute an additional design constraint that may exclude that the handles are given a more attractive form, or at least more attractive or original than that of the known handles.

The assigned purposes of the invention consequently aim to overcome these disadvantages mentioned above and to propose a new domestic pressure cooker whose construction is particularly simple, reliable and cheap.

Another purpose of the invention is to propose a new domestic pressure cooker whose general construction principle is well known and tested.

Another purpose of the invention is to propose a new domestic pressure cooker of especially robust design.

Another purpose of the invention is to propose a new domestic pressure cooker offering excellent safety of use.

The assigned purposes of the invention are achieved with the aid of a domestic pressure cooker comprising:
 a pan which itself comprises a wall,
 a lid designed to be attached to the pan to form with the latter a cooking chamber that is substantially impervious,
 and at least one gripping part, attached to the pan by means of attachment means,
 characterised in that the attachment means at least comprise:
  an attachment orifice passing through the wall of the pan, wherein said attachment orifice is positioned on the wall of the pan so that it does not communicate with the inside of the cooking chamber,
  and an attachment part, connected to the gripping part and extending through the attachment orifice.

Other specific aspects and advantages of the invention will appear in more details upon reading the following description, in reference to the appended drawings provided by way of illustration and in no way restrictively, in which.

Figure 1:
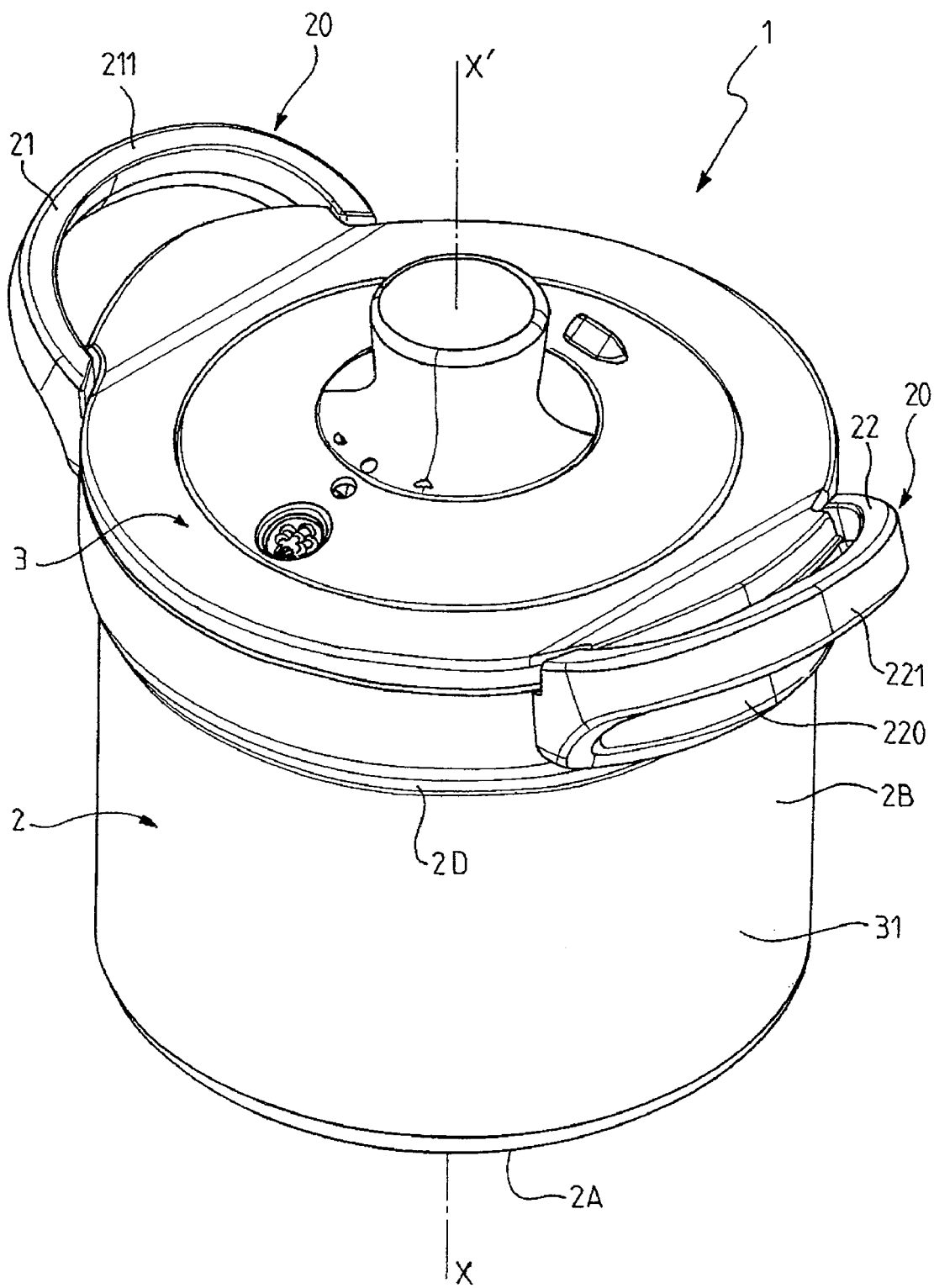
FIG. 1 illustrates, according to a general perspective view, a domestic pressure cooker compliant with the invention.
Figure 2:
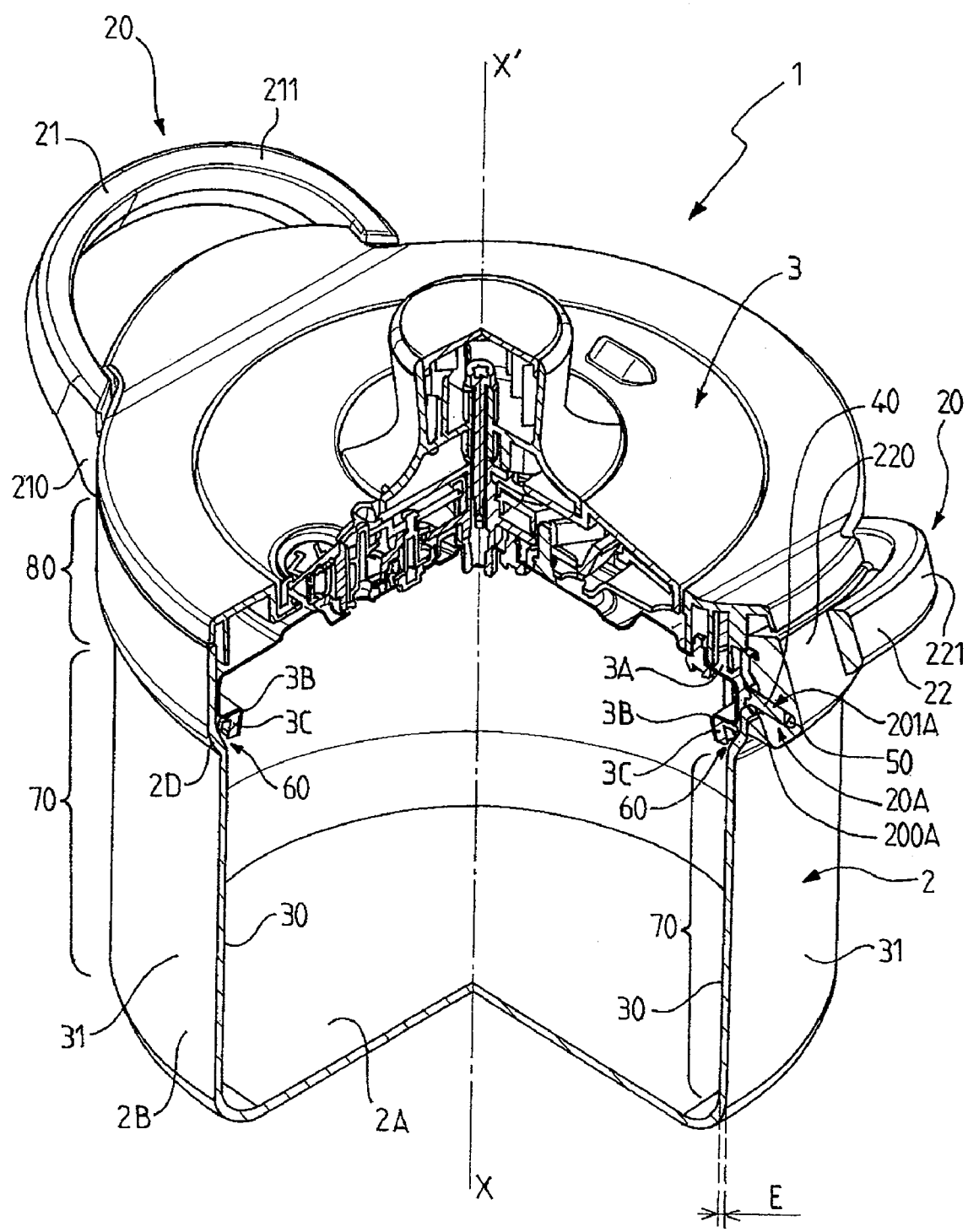
FIG. 2 illustrates, according to a general perspective view that is partially sectioned, according to two cross sectional planes that are substantially perpendicular, the pressure cooker of FIG. 1.

The pressure cooker 1 compliant with the invention is designed to cook various foods under pressure in a domestic context. To this end it is a domestic pressure cooker.

The pressure cooker 1 compliant with the invention is therefore a kitchen utensil of a portable (which is to say it may be moved manually) and independent nature.

Advantageously, the pressure cooker 1 compliant with the invention constitutes a pot that is thermally passive, designed to be pressurised by the effect of an external source of heat, such as a cooking hob.

In preference, the pressure cooker 1 compliant with the invention comprises a pan 2 forming a cooking recipient and advantageously substantially with a revolution symmetry according to an axis X-X'. In the rest of the description, the adjective "axial" refers to the direction of this axis of symmetry X-X', a direction which is similar to the vertical direction when the appliance is in normal use, the pan 2 is for example and usually manufactured by stamping a blank made from a metallic material such as aluminium or stainless steel.

The pan 2 also comprises a wall, wherein said wall itself comprises, in the embodiment shown:
a base 2A, which has for example a disc shape,
and a lateral wall 2B, which rises from and at the periphery of said base 2A; said lateral wall 2B has a substantially annular shape and defines an upper opening 2C which allows food to be introduced into the pan 2, so that it may be cooked; said lateral wall 2B also has an inside face 30 located opposite the inside of the pan 2 and an outside face 31 opposite.

The pressure cooker 1 compliant with the invention also comprises a lid 3 designed to be added onto said pan 2 to form with the latter a cooking chamber that is preferably substantially impervious, which is to say sufficiently hermetic to allow an increase in pressure inside it.

Consequently, the chamber formed by joining the Pan 2 and the lid 3 is designed to permit a considerable increase in the pressure inside it, so that during cooking, the pressure inside the chamber may be significantly higher than the atmospheric pressure, and for example exceed said atmospheric pressure by a value equal to or greater than 10 kPa, and preferably equal to or greater than 20 kPa. It may also be envisaged, in order to permit very rapid and efficient cooking, for the chamber to be designed so that the pressure inside it may exceed the atmospheric pressure by a value substantially between 40 and 110 kpa, and preferably substantially between 50 and 100 kPa.

The lid 3 preferably has a general disc shape, 20 that is complementary to the shape of the pan 2.

Figure 3:
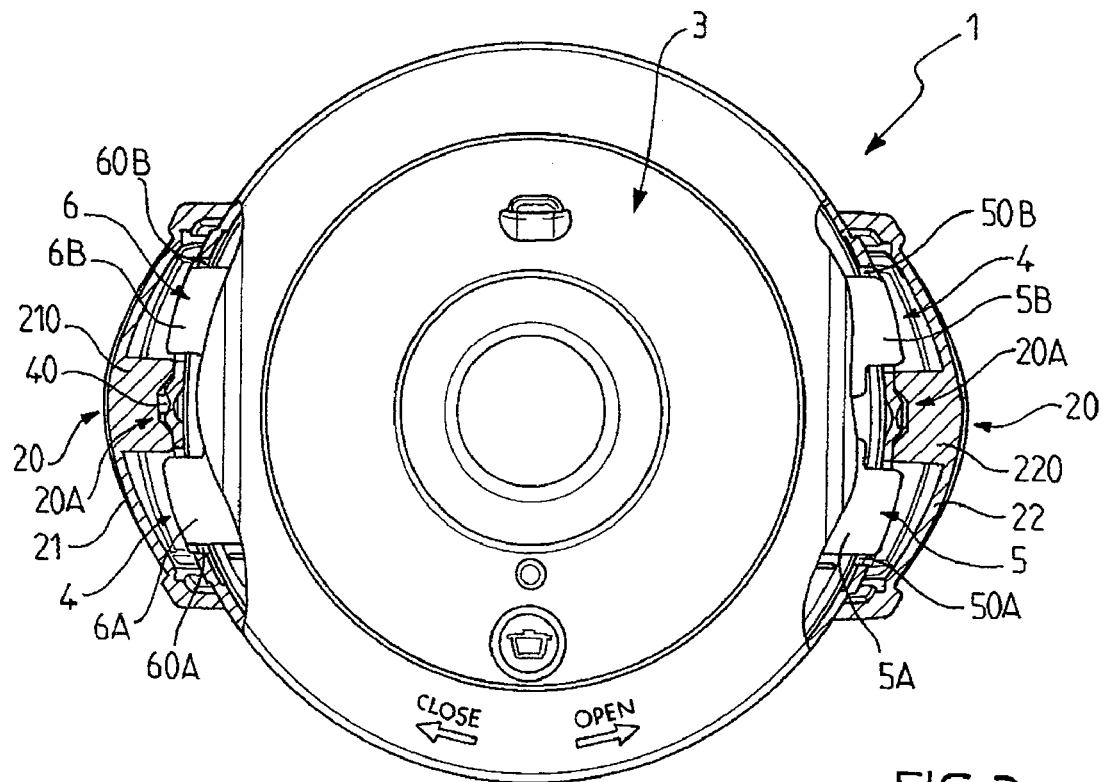
FIG. 3 illustrates, according to a top view that is partially revealed and cross sectioned, the pressure cooker of FIGS. 1 and 2 with the lid locked onto the pan.

Advantageously, the lid 3 may be locked or released as required from the pan 2, wherein locking the lid 3 permits the chamber to increase in pressure without the lid 3 escaping under the effect of the pressure. For this purpose, the pressure cooker 1 preferably comprises means 4 of locking/releasing the lid 3 on the pan 2. The locking/release means 4 may be of any type known to a person skilled in the art, and is usually able to change between a configuration where the lid 3 is relatively locked onto the pan 2 (especially illustrated in FIG. 3) wherein the lid 3 is attached to the pan 2, and a configuration where the lid 3 is relatively released from the pan 2 (especially illustrated in FIG. 4), wherein the lid 3 may be freely separated from the pan 2.

Figure 4:
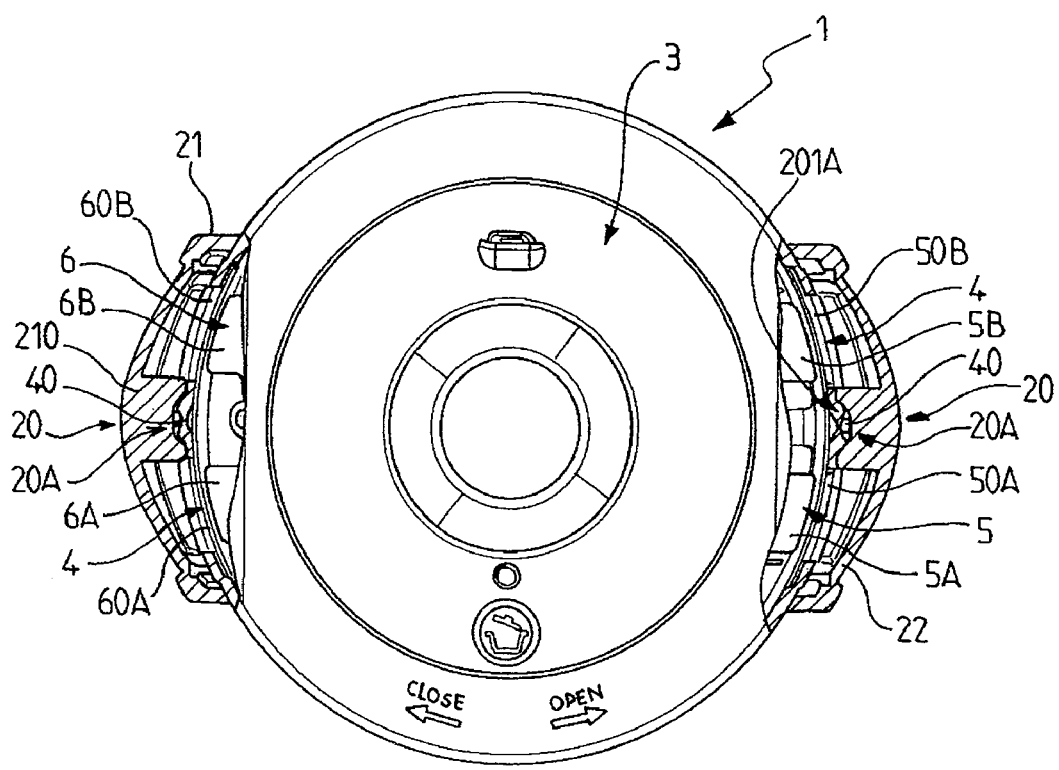
FIG. 4 illustrates, according to a top view that is partially revealed and cross sectioned, the pressure cooker of FIGS. 1 to 3 with its lid unlocked on the pan.
Figure 5:
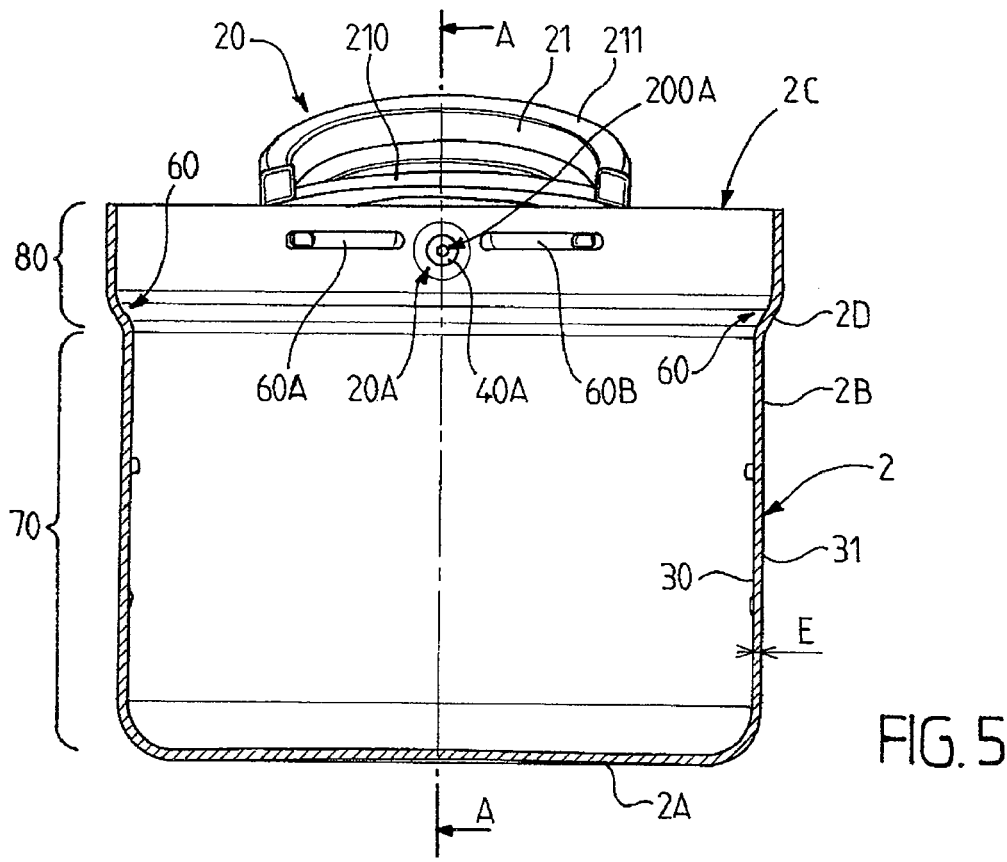
FIG. 5 illustrates, according to lateral cross sectional view, the pan of the pressure cooker illustrated in FIGS. 1 to 4.
Figure 6:
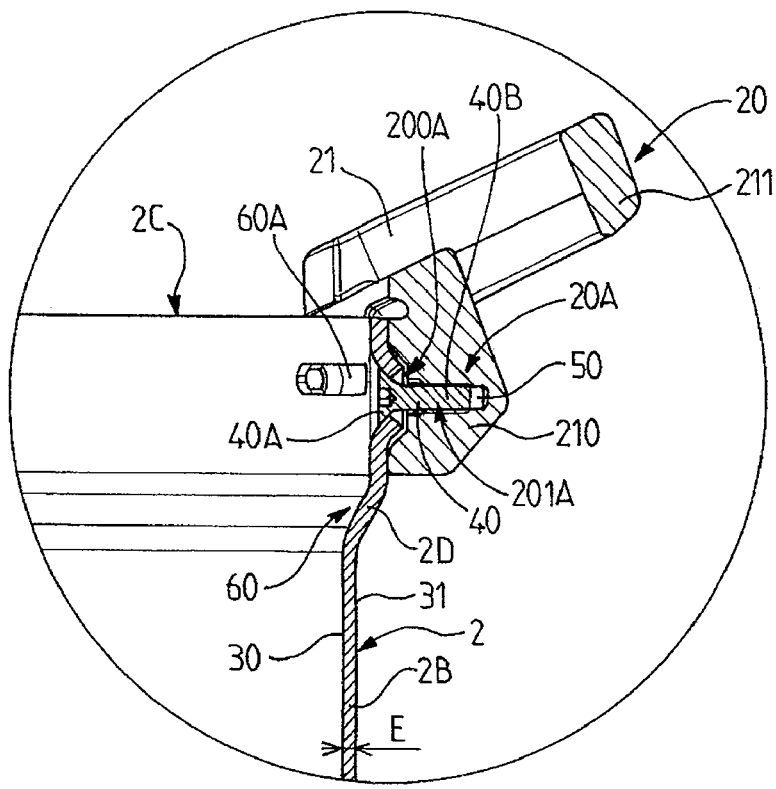
FIG. 6 illustrates, according to a cross sectional view according to the line A-A of FIG. 5, an enlarged detailed view of the pan illustrated in FIG. 5.
Figure 7:
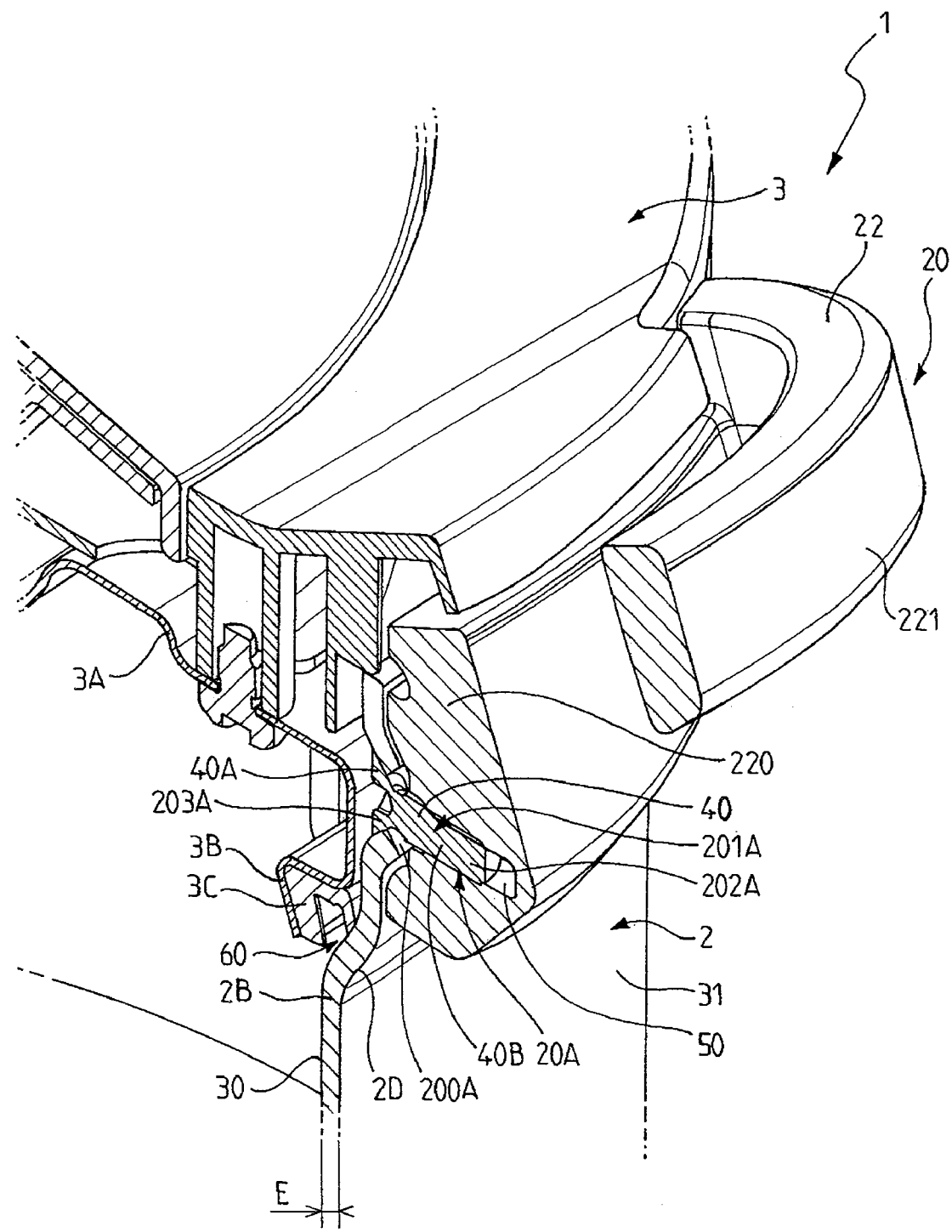
FIG. 7 illustrates, according to a cross sectional perspective view, a detail of the pressure cooker illustrated in FIGS. 1 to 4.

Preferably, locking/release means 4 at least comprises a part 5, 6 for relatively locking the lid 3 onto the pan 2, wherein said at least one locking part 5, 6 has a mobile mounting on the lid 2, substantially in radial translation with respect to the X-X' axis by at least one corresponding drive means between an indexed locking position (illustrated for example in FIG. 3) and an indexed release position (illustrated for example in FIG. 4).

According to one embodiment not shown, said at least one locking part 5, 6 may comprise jaws designed to clamp the peripheral edges of the pan 2 and the lid 3. Said jaws may be in the form of a metal plate, with a U shaped profile at its external end, as is well known itself to a person skilled in the art.

According to the preferred alternative embodiment illustrated in the figures, the pressure cooker 1 compliant with the invention comprises two locking parts 5, 6 formed by bifid segments each with two respective locking pins 5A, 5B, 6A, 6B wherein said segments are positioned opposite one another, diametrically opposed opposite the general axis of symmetry X-X' of the appliance.

Advantageously, the drive means of each bifid segment consists of a respective drive arm, wherein said drive arm may for example be of the same material as its corresponding segment.

Locking openings 50A, 50B, 60A, 60B that are complementary to the pins 5A, 5B, 6A, 6B are fitted inside the pan 2, so that the locking of the lid 3 corresponds to the insertions of the pins 5A, 5B, 6A, 6B into the respective complementary openings 50A, 50B, 60A, 60B (refer to FIG. 3), like a pin—strike plate lock system, substantially to prevent any movement of the lid 3 with respect to the pan 2, while the release of the lid 3 corresponds to the removal and withdrawal of the pins 5A, 5B, 6A, 6B from the corresponding openings 50A, 50B, 60A, 60B so that said pins do not engage with said openings 50A, 50B, 60A, 60B.

The means 4 of locking/releasing the lid 3 relative to the pan 2 are not limited however to a segment or jaw system and may for example be based on other principles, well known as such, of the bayonet locking/release type or clamp locking/release type.

In compliance with the invention, the pressure cooker 1 also comprises at least one gripping part 20 attached to the pan 2 and preferably attached directly to the wall of the pan 2. The gripping part 20 is designed to allow the user to handle not only the pan 2 on its own but also and most especially the complete pressure cooker 1 (formed by the assembly of the pan 2 and the lid 3), especially when said pressure cooker 1 is filled with food that is cooked or to be cooked, possibly with a cooking liquid. The gripping part 20 is therefore designed to permit the pressure cooker 1 to be held easily and firmly, so that the user may move the pressure cooker 1 manually as required without the risk of the latter being dropped. Preferably and as illustrated in the figures, the gripping part 20 at least comprises a handle 21 substantially extending from and towards the outside of the pan 2, radially with respect to the X-X' axis.

The gripping part 20 is attached to the pan 2 by means of attachment means 20A permitting a mechanical connection to be made, and preferably an embedded mechanical connection, between the gripping part 20 and the pan 2. Preferably, the gripping part 20 is distinct and independent from the pan 2, and is added and attached to the latter, by means of attachment means 20A. The attachment means 20A therefore permit to subject, which is to say to attach the gripping part 20 directly onto the pan 2.

According to the invention, the attachment means 20A at least comprise an attachment orifice 200A passing through the wall of the pan 2, which is to say extending through the entire thickness E of said pan wall.

The attachment orifice 200A is, in compliance with the invention, positioned on the wall of the pan 2 so that it does not communicate with the inside of the cooking chamber. This means that if the attachment orifice 200A is indeed fitted through the wall of the pan 2 so that it passes completely through the latter, it is located at a position on the wall of the pan 2 that does not help to form, with the lid 3, the impervious cooking chamber.

In compliance with the invention, the attachment means 20A also comprise an attachment part 201A, connected to the gripping part 20 and which extend through the attachment orifice 200A, to attach the gripping part 20 to the wall of the pan 2. The attachment part 201A is therefore passed through the attachment orifice 200A, so that it passes through the entire thickness E of the wall of the pan.

Preferably, the attachment part 201A extends through the attachment orifice 200A, between an external end 202A subject to the gripping part 20 and an inside end 203A fitted with a head which comes into contact with the pan 2, around the orifice 200A, as illustrated in the figures.

The invention is therefore based on a very simple principle of the attachment of the gripping part 20 onto the wall of the pan 2, wherein this attachment principle is based on the engagement of a hole passing through the pan wall from one side to the other and an attachment part passant through said hole.

In order to avoid having to design and manufacture a special system to allow the seal of the cooking chamber to be preserved (which is absolutely necessary given that the pressure cooker 1 is by nature designed to permit the significant increase in pressure of the chamber), the invention provides for the attachment orifice 200A to be positioned in a zone of the wall of the pan 2 that does not directly contribute to forming the cooking chamber, so that any sealing problems are consequently removed.

Thanks to this specific positioning of the attachment orifice 200A, it is not necessary to use an extra attachment part such as a bridge added on by welding on the outside face of the pan 2 as in the prior art.

Finally, the invention permits the gripping part 20 to be attached to the pan 2 by simply using an attachment orifice directly in and through the wall of the pan 2 (and not through an appended part added to the pan), while ensuring a durable seal of the cooking chamber.

Advantageously, the attachment orifice 20A passes through the lateral wall 2B of the pan 2, wherein said orifice 200A extends through the entire thickness E of the lateral wall 2B, between the inside face 30 of the lateral wall 2B, positioned opposite the inside of the pan 2, and the outside face 31 of said lateral wall 2B, opposite the inside face 30 and positioned towards the outside of the pressure cooker 1.

Preferably, as illustrated in the figures, the pressure cooker 1 comprises two handles 21, 22 positioned diametrically opposite on the pan 2 relative to the axis of symmetry X-X'. The two handles 21, 22 are preferably identical, and for example each comprise a base 210, 220 fixed directly to the wall of the pan 2 and from which a handle 211, 221 extends which is made from the same material as the base and is designed to be held manually by the user. More precisely, in the example illustrated in the figures, each handle 21, 22 is directly added onto the outside face 31 of the lateral wall 2B of the pan 2. Each handle 21, 22 is preferably attached to the pan 2 in the same way, which is to say by means of corresponding attachment means which comprise an attachment orifice and an attachment part compliant with the above description.

Advantageously the attachment part 201A at least comprises one screw 40 equipped with head 40A and a threaded rod 40B extending from said head 40A through the attachment orifice 200A. The gripping part 20 is advantageously equipped with a tapped hole 50 into which the threaded rod 40B is screwed, wherein the head 40A (whose diameter is larger than that of the rod 40B) is positioned inside the pan 2 and is in contact with the latter, which is to say against the inside face 30 of the lateral wall 2B.

Preferably, the tapped hole 50, which is for example located in the base 220 of the handle 22, is blind. In other terms, the tapped hole 50 does not open out onto the outside of the appliance, so that once the handle 22 is assembled onto the pan 2, the attachment means 20A are completely hidden and are not accessible from the outside of the pressure cooker 1. This of course has an advantage in aesthetic terms, as the screw 40 is invisible, but also and most especially has an advantage in terms of safety as the screw cannot come into contact, on the outside of the pressure cooker 1, with the hand of the user. On the contrary, the threaded rod 40B is entirely located inside the handle 22, which is preferably made from a thermally insulating material, so as to procure complete thermal insulation for the user. Preferably, each handle 21, 22 is made in one piece made from a heat-hardening material, obtained for example by moulding, on the understanding that any other material which satisfies the thermal constraints may be envisaged (metallic material for example).

The tapped hole 50 is preferably located directly in the material forming the base 220, by any known machining technique. However, it may be envisaged to provide, according to an alternative solution, that the tapped hole 50 is made in an insert, for example metallic, wherein said insert is itself incorporated into the base 220 for example by screwing or moulding on.

Advantageously, the lid 3 is designed to come into contact with the lateral wall 2B of the pan 2 according to a substantially impervious interface zone 60 to form the cooking chamber. The cooking chamber is thus defined by the base 2A, the lid 3, the interface zone 60 and the portion 70 of the lateral wall extending from the base 2A and the interface zone 60. The attachment orifice 200A is located outside of this first portion 70. The attachment orifice 200A is for example located in a second portion 80 of the lateral wall extending from the portion 70 which helps to define the chamber, wherein said portion 80 extends from the portion 70 to the upper opening 2C. In other terms, the cooking chamber extends, according to the vertical direction defined by the X-X' axis, between the base 2A and a seal line corresponding to the interface zone between the lid 3 and the pan 2, wherein the attachment orifice 200A is located in the wall of the pan 2 outside of the defined zone between the base 2A and the interface zone 60. This means that the attachment orifice 200A is located on the wall of the pan 2, at a height above that of the interface zone 60 forming the seal line (with respect to a reference whose origin corresponds for example to the base 2A).

Preferably, the lid 3 comprises a descending edge 3B, substantially extending from the bottom from a main body 3A which itself is designed to be located parallel to the base 2A. The descending edge 3B is designed to be inserted into the pan 2, inside the latter to make an impervious contact with the inside face 30 of the lateral wall 2B.

Preferably, the descending edge 3B is equipped with a seal 3C by means of which the impervious contact between the pan 2 and the lid 3 is made.

Preferably, in order to facilitate the contact between the lid 3 and the lateral wall 2B, the latter has a recess 2D against which the seal 3C comes into contact. Consequently, in the example illustrated in the figures, the recess 2D is a substantially truncated portion of the lateral wall 2B which connects two other portions of said lateral wall 2B, wherein these two other portions are each substantially vertical but have different diameters. The pan 2 is flared from the base 2A.

The invention claimed is:

1. Domestic pressure cooker (1) comprising:
   a pan (2) which itself comprises a wall, having a first portion and a second portion,
   a lid (3) designed to be attached to the pan (2) to form with said first portion a cooking chamber that is substantially impervious, to allow an increase in pressure therein,
   at least one gripping part (20), attached to said second portion of the pan (2) by means of attachment means (20A),
   in which the attachment means (20A) at least comprise:
   an attachment orifice (200A) passing through the second portion of the wall of the pan (2), wherein said attachment orifice (200A) is positioned on the second portion of the wall of the pan (2) so that it does not communicate with the cooking chamber,
   and an attachment part (201A), connected to the gripping part (20) and extending through the attachment orifice (200 A).

2. Pressure cooker (1) according to claim 1 in which the wall of the pan (2) itself comprises a base (2A) and a lateral wall (2B) which rises from said base (2A), wherein said attachment orifice (200A) is positioned through said lateral wall (2B).

3. Pressure cooker (1) according to claim 2 in which the lid (3) is designed to come into contact with the lateral wall of the pan (2) according to a substantially impervious interface zone (60) to form the cooking chamber, wherein said cooking chamber is defined by the base (2A), the lid (3), the interface zone (60) and a portion (70) of the lateral wall (2B) extending between the base (2A) and the interface zone (60), wherein the attachment orifice (200A) is located outside of said portion (70).

4. Pressure cooker (1) according to claim 2 in which the lateral wall (2B) has an inside face (30) and an outside face (31), and wherein the lid (3) has a descending edge (3B) designed to be introduced into the pan (2) to come into impervious contact with said inside face (30) of the lateral wall (2B).

5. Pressure cooker (1) according to claim 4 in which said descending edge (3B) is equipped with a seal (3C) via which the impervious contact between the pan (2) and the lid (3) is made.

6. Pressure cooker (1) according to claim 1 in which the gripping part (20) at least comprises a handle (21) substantially extending radially from the outside face of the pan (2).

7. Pressure cooker (1) according to claim 1 in which the attachment part (201A) extends, through the attachment orifice (200A), between an outside end (202A) subject to the gripping part (20) and an inside end (203A) fitted with a head which comes into contact with the pan (2).

8. Pressure cooker (1) according to claim 1 in which the attachment part (201A) at least comprises a screw (40) equipped with a head (40A) and a threaded rod (40B) extending from said head (40A) through the attachment orifice (200A), wherein the gripping part (20) is fitted with a tapped hole (50) into which the threaded rod (40B) is screwed, wherein the head (40A) is positioned inside the pan (2) and comes into contact with the latter.

9. Pressure cooker (1) according to claim 8 in which said tapped hole (50) is blind.

10. Pressure cooker (1) according to claim 1 in which the gripping part (20) is directly attached to the wall of the pan (2).

* * * * *